Nov. 21, 1961 C. M. MELAS 3,010,073

PERIODIC SIGNAL GENERATOR

Filed Nov. 9, 1959

2 Sheets-Sheet 1

UNIVERSAL RESONANCE CURVE FOR PARALLEL RESONANT CIRCUIT (SINGLE VALUE OF Q).

*INVENTOR.*
CONSTANTIN M. MELAS
*BY*
Fraser and Bogucki
ATTORNEYS

Nov. 21, 1961

C. M. MELAS

PERIODIC SIGNAL GENERATOR 3,010,073

Filed Nov. 9, 1959

2 Sheets-Sheet 2

INVENTOR.
CONSTANTIN M. MELAS
BY
Fraser and Bogucki
ATTORNEYS

United States Patent Office 3,010,073
Patented Nov. 21, 1961

3,010,073

PERIODIC SIGNAL GENERATOR

Constantin M. Melas, Saratoga, Calif., assignor to International Business Machines Corporation, New York, N.Y., a corporation of New York Filed Nov. 9, 1959, Ser. No. 851,671
9 Claims. (Cl. 331—1)

This invention relates to periodic signal generating circuits which are highly stable, and more particularly to a new and improved circuit for providing self-clocking signals for the derivation of information from binary coded signals.

Stable sources of electrical signals of constant frequency have many uses in modern electronic systems and circuits. When a frequency can be precisely established, the accuracy of measurement and instrumentation equipment can often be materially increased. Similarly, the advantages of stable sawtooth pulse generators for oscilloscopes and television equipment are well known. Accurately controlled frequencies inherently permit communications systems to operate more efficiently while demanding less bandwidth. In general, an accurately operating source of periodic signals is of potential value wherever there is a problem of synchronization of the elements of a system of one circuit with another.

While many periodic signal generators are known which maintain frequency accurately, there has heretofore been a more or less direct relationship between the degree of accuracy achieved and the cost of the equipment involved. Crystal-controlled oscillators and systems using simulated emission of radiation for frequency control can both be very precise, for example, but both often are more expensive than can be tolerated in many commercial installations. Both types of systems are also cumbersome and bulky, and thus emphasize the desirability of an extremely stable but inexpensive and compact source of pulses or oscillations of a given frequency. Additionally, such frequency stabilized devices cannot readily be controlled externally so as to be synchronized with selected signals.

A system in which a stable pulse generator is of particular utility is a communications network in which binary data is derived at a receiver from transmitted information by a self-clocking technique. To develop the information content of the received data signals, the signals are sampled or "clocked" at each binary digit time. The binary state of the data signal during the clocking interval determines the value of the corresponding digit. In this operation, the clock signal must be kept in synchronism with the digit rate of the binary data signals. However, short or long term effects, or both, may disturb the synchronism.

For synchronization of data clocking with the digit rate of binary signals, therefore, a separate clocking signal which is generated or transmitted independently of the data is sometimes used. A separate clock track on a magnetic drum may be used for this purpose, or a pilot or timing frequency may be transmitted along with but independently of a communicated message. Arrangements which use the separate clock track on a magnetic drum are relatively inflexible, however, and thus not compatible with systems in which the digit rate or the relative position of the drum transducers are subject to change. The use of a pilot frequency in a data transmission system also has a number of drawbacks. In the first place, considerable circuitry generally must be devoted to making use of the pilot frequency. Second, the presence of the pilot frequency is apt to cause interference with the data signal at high digit rates. In addition, the characteristics of the transmission medium may have different effects on the pilot signal than on the data signal, thus affecting the operation of the receiver.

When the communication system which is involved is a standard telephone network, some specific problems must be overcome. Because of the relatively low information transmission rate of the usual telephone communication circuit, telephone circuits need not be, and are not, designed for low noise and low distortion levels. Accordingly, messages transmitted over telephone channels are subject to momentary phase deviations, or "jitter" distortions, which are a function of line delay. While the average frequency of the received signal is not affected, the instantaneous frequency may change as much as fifty percent relatively quickly, as within a few binary digits.

In order to overcome jitter and other types of distortion, and to make receiver systems compatible with different line lengths and digit rates, there has been employed an advantageous arrangement described in a copending application, Serial Number 824,380, filed July 1, 1959, and entitled "Self-Clocking System for Binary Data Signal." In accordance with the invention there described, a free-running multivibrator generates an output signal corresponding to the digit rate of the data signal. In response to a binary transition in the data signal, the multivibrator is clamped to a predetermined voltage level for a one-half interval, so that it continues to be free-running but in a newly established phase. The output signals from the multivibrator are thus available as a time reference for clocking the data signals. While this system effectively overcomes jitter distortion, it depends to some degree upon relatively short intervals between successive binary transitions in the data. When relatively long intervals transpire between transitions, the multivibrator may become subject to long term drift. The longer the interval without a binary transition, the more precise must be the frequency of the multivibrator. The normal operation of the circuit and receiver, however, cannot be affected by any technique used to insure against long term drift. Because of the many receivers which can be used with such a system, moreover, the protection against long term changes in frequency must be obtained as economically as possible.

It is therefore an object of the present invention to provide new and improved pulse generators which are extremely stable in frequency.

It is another object of the present invention to provide an extremely simple and compact but at the same time highly accurate source of alternating current signals.

Yet another object is to provide a new arrangement for stabilizing the operation of an astable multivibrator.

A further object of the invention is to provide clocking circuits for binary data systems, which circuit operates in response to binary transitions in the data to effect a self-clocking of the data.

It is yet another object of the present invention to provide an improved self-clocking system which is free of the effects of jitter distortion and long term drift.

These and other objects are achieved by an arrangement in accordance with the invention which compares the phase of signals from a passive reference network with those from a source of oscillations whose frequency is to be precisely stabilized. The phase comparison provides an error signal which is used for an automatic and accurate adjustment of the frequency of the source.

In one particular embodiment of the invention, a free-running transistor multivibrator may be coupled to a stabilizing circuit which includes a tuned circuit which is resonant at the frequency to be maintained. Signals from the multivibrator cause the tuned circuit to provide signals of the same frequency but of a phase which depends upon the variation of the multivibrator frequency from the desired freqeuncy. Signals from the tuned circuit are shifted in phase by 90° and then applied to one input of a phase detector, the remaining input of which is controlled by signals applied directly from the multivibrator. Outputs from the phase detector, when passed through a low-pass filter, provide error signals which are of proper sense and amplitude to correct the frequency of the multivibrator. Transistor circuits thus constructed involve only relatively few circuit elements but provide an extremely stable and accurate source of oscillations which can be externally controlled for synchronization if desired.

In accordance with other features of this invention, there are provided improved systems for providing self-clocking of binary data signals which are subject to jitter distortion. A controllable source of oscillations may be resynchronized with each binary transition in the signal train. Tendencies of the source to drift in frequency may be overcome by a stabilizing circuit employing a tuned circuit to maintain the average frequency of the source substantially constant. Thus, the system provides self-clocking in the presence of jitter distortion and despite relatively long transmission periods in which no binary transitions are available for synchronization.

A better understanding of the invention may be had from a reading of the following detailed description and an inspection of the drawings, in which.

Figure 1:
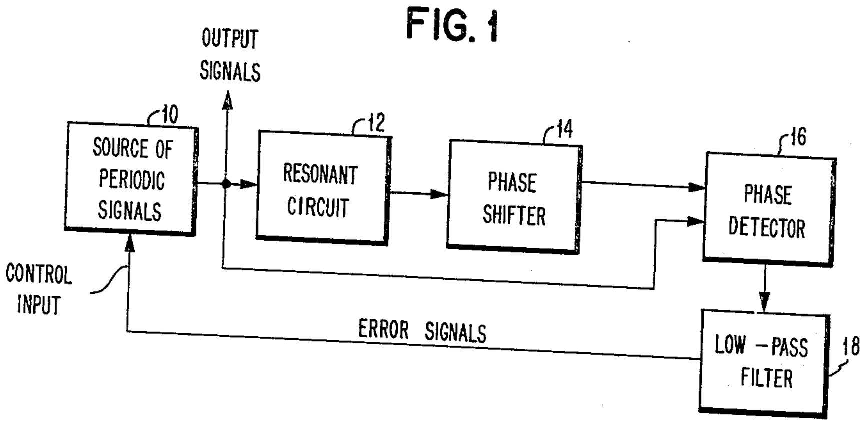
FIG. 1 is a block diagram of one arrangement in accordance with the invention.

Referring now to FIG. 1, a periodic signal generator in accordance with the invention may utilize a source of periodic signals 10. The source 10 may be any suitable generator, such as an astable or free-running multivibrator, a sawtooth generator or some other form of oscillatory device. In the present arrangement, the source of periodic signals 10 is selected to have a nominal or characteristic frequency and to be controllable in frequency within limits, although the limits may be relatively narrow. The source 10 may also be subject to some long term drift from its center frequency. It is desired to maintain the source 10 at the selected center frequency, and to this end the type of source 10 which is used has a control input to which control signals, such as biasing signals, may be applied to cause correction or adjustment of the frequency.

Output signals from the source of periodic signals 10 are applied to a resonant circuit 12, such as a series resonant circuit, a parallel resonant circuit or any form of passive network or device having a particular characteristic, as described below. For a given frequency, which corresponds to the center frequency of the source 10, the resonant circuit is tuned to pass an output signal which is at the same frequency and in the same phase. When the exciting frequency varies on either side of the center frequency, however, the output signals from the resonant circuit 12 lead or lag in phase although they are of the same frequency. As a result, this passive resonant circuit 12 provides a separate signal which serves as a stable frequency reference for the source of periodic signals 10.

Outputs from the resonant circuit 12 are provided to a phase shifter 14, such as a fixed 90° phase shifter, which places signals from the resonant circuit 12 in phase quadrature relationship with signals from the source of periodic signals 10 when the frequency of the signals corresponds to the center frequency of the resonant circuit 12. While the phase shifter 14 is shown coupled to the resonant circuit 12, it will be understood that only a relative phase displacement of the signals is sought, so that the phase shifter 14 may be coupled to the source of periodic signals 10 instead. The term "phase quadrature relationship" is to be taken as referring to the fixed shift in phase established between the signals from the resonant circuit 12 and the signals from the source of periodic signals 10, and does not include the variable phase shift introduced by the resonant circuit 12 alone. Such variable phase shift is to be considered as "relatively small," as it is always somewhat less than 90° in the operation of the present arrangement.

Signals taken directly from the source of periodic signals 10 and from the phase shifter 14 are applied to two inputs of a phase detector circuit 16. Here the term "phase detector" should be taken to refer to the general class of devices which provides a phase comparison between two signals. Using one periodic signal as a reference, such devices develop an output signal which is representative of the phase relation of a second signal to the first. Such devices are available in the form of electron tube, transistor and electromechanical circuits and also may be called phase modulators or synchronous demodulators. In the present example, the phase detector 16 operates to develop an output signal whose instantaneous value is dependent upon the instantaneous phase relation of the signals from the phase shifter 14 and from the source of periodic signals 10.

Outputs from the phase detector 16 are in effect averaged by being passed through a low pass filter 18, the output circuit of which is coupled to the control input of the source of periodic signals 10. There is thus provided a complete control loop which includes as an integral part the source 10 whose output signals are to be maintained at the desired center frequency.

In operation, the tendency of the source of FIG. 1 to drift is continuously minimized, so that the average frequency of the output signals is substantially free of drift. To this end, effective use is made of the dependence of the phase of the signals passed by the resonant circuit 12 upon the frequency of the signals. For a parallel resonant circuit 12, a relatively small downward drift in the frequency causes of a corresponding lag in the phase angle of the signals therefrom. This lag in the phase angle serves as a measure of the frequency correction needed to correct the tendency to drift. The correction signal is effectively generated by the remainder of the control loop.

First it should be understood that the function of the 90° phase shift introduced by the phase shifter 14 is to place the signals to be compared into a relationship from which readily usable error signals may be simply derived. This fact may be more readily visualized when considering the effect of the comparison of two sine waves. When two sine waves of a given frequency are directly in phase, a phase detector operating in response to the two sine waves provides a continuous and maximum amplitude signal. Therefore, when the phase of one sine wave varies relative to the other, the amplitude of the output can only diminish, and there is no indication of the sense of the phase shift between the two signals. A like situation obtains for signals which are directly out of phase, because the phase detector then provides a continuous signal of maximum negative amplitude.

With the phase quadrature relationship between the two sine waves, however, the phase detector operates in the region of a zero crossing characteristic. For exact phase quadrature the output of the phase detector varies so as to have symmetric positive and negative periods, but when averaged over a time interval the output is substantially zero. Slight shifts in the relative phase of the two sine waves causes a change in the balance between the positive and negative portions of the signals. Thus, when the signals are averaged they provide positive or negative error signals which correspond in sense to the nature of the phase deviation of the two sine waves. Although the signals have been referred to by way of illustration as sine waves, it will be appreciated that the same considerations apply to square waves and other forms of symmetric periodic signals.

Any tendency of the output signals from the source of periodic signals 10 to drift, therefore, results in a phase change from the output of the resonant circuit 12, and the generation of an error signal which acts to correct the frequency of the source of periodic signals 10 and to reestablish the center frequency.

Figure 2:
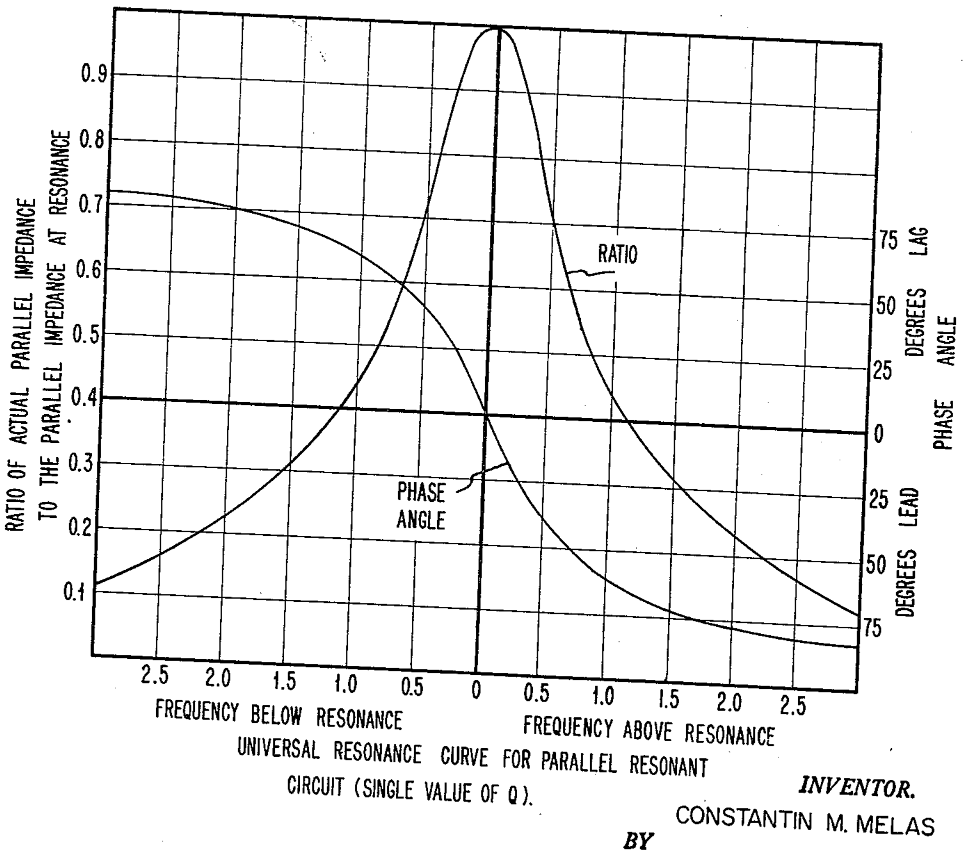
FIG. 2 is a graphical representation of the universal resonance curve for a parallel resonant circuit, which is useful in explaining the invention.

The characteristic by which a resonant device, such as the resonant circuit 12, provides a phase variation corresponding to the deviation of a signal from a center frequency may be better understood by reference to FIG. 2. The relationships there shown correspond in terminology and expression to the description contained at pages 136 and 137 of the book "Radio Engineers' Handbook," by Frederick E. Terman, published by the McGraw-Hill Book Company, New York, 1943. Although the universal curve which is represented in FIG. 2 is taken only for a single value of Q, it will be appreciated that other values of Q have a like general configuration. For clarity, a bell-shaped curve representing the ratio of the actual parallel impedance to the parallel impedance at resonance has been included. A relationship which is of more interest here, however, is the curve of phase angle for varying values of frequency above and below resonance. It may be seen in FIG. 2 that there is an adequate general correspondence between phase angle and frequency, and that for parallel resonant circuits the phase lags for frequencies below resonance and leads for frequencies above resonance. With series resonant circuits these relationships are different, but may nonetheless be effectively used in arrangements in accordance with the present invention.

Figures 3, 4:
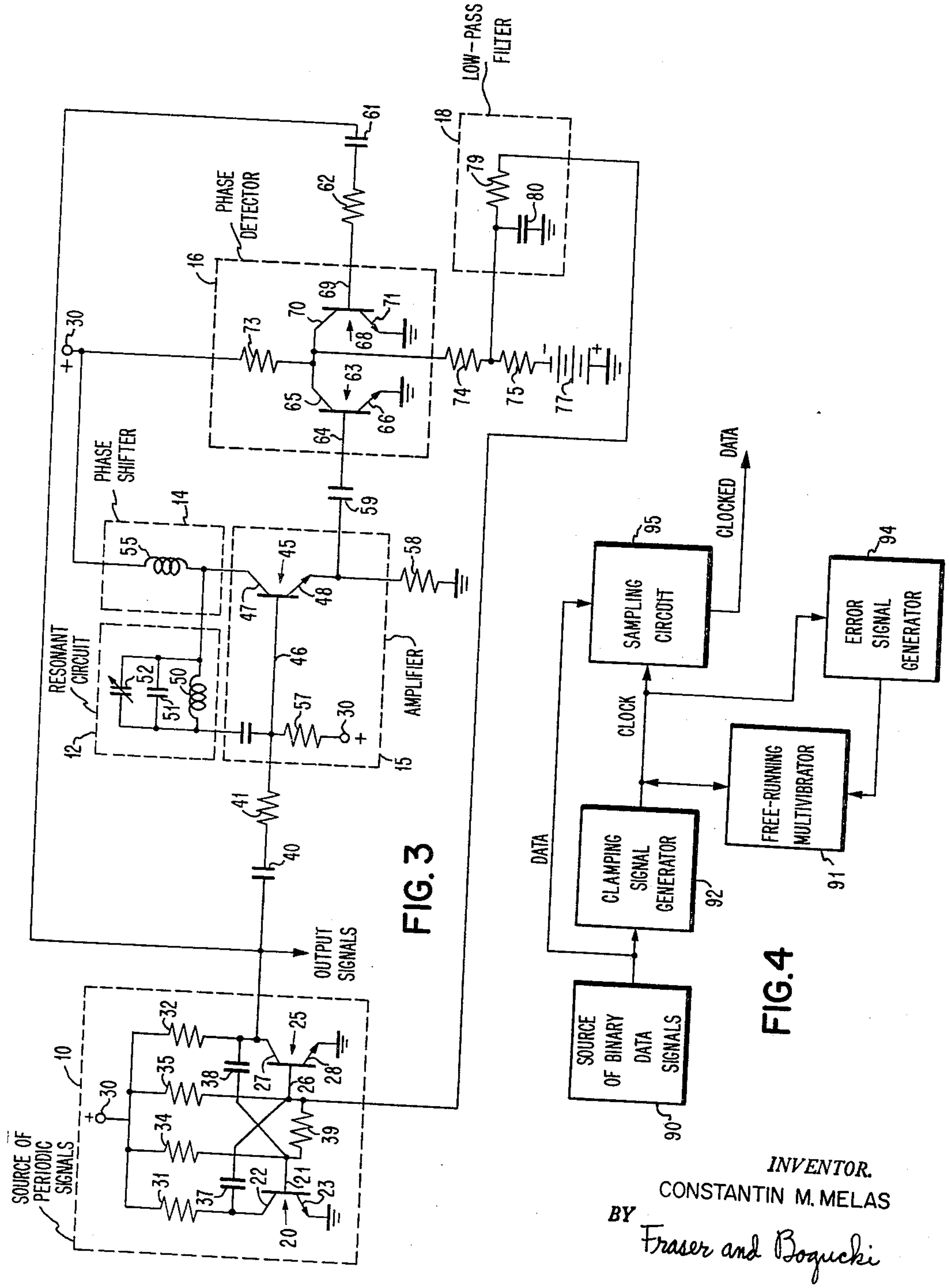
FIG. 3 is a schematic circuit diagram of one circuit which corresponds to the arrangement of FIG. 1.
FIG. 4 is a block diagram of a form of self-clocking system for binary data signals which may be provided in accordance with the invention.

A detailed exemplification of circuits in accordance with the invention is provided by the arrangement illustrated in the schematic diagram of FIG. 3. The stabilized source of periodic signals there shown consists primarily of transistor circuitry which is characterized by compactness and economy. Where feasible and appropriate, the elements corresponding to the elements of FIG. 1 have been given like numbers.

In the arrangement of FIG. 3, the source of periodic signals 10 is provided by a free-running or astable multivibrator which includes first and second multivibrator transistors 20 and 25, respectively. Both of the multivibrator transistors 20, 25 are of the N-P-N conductivity type, and have their emitters 23, 28 coupled to ground, and their collectors 22, 27 coupled to a source of positive potential 30 through individual ones of a pair of load resistors 31 and 32, respectively. A pair of bias control resistors 34 and 35 couple the source of positive potential 30 to the bases 21 and 26, respectively, of the first and second multivibrator transistors 20, 25 to maintain the transistors 20, 25 conductive. Cross-connections between the collectors and bases of the two multivibrator transistors 20, 25 are made through a pair of capacitors 37, 38 which serve to establish the time constants of the multivibrator and the frequency of the periodic output signals.

While output signals may be taken from the collector 22 or 27 of either of the multivibrator transistors 20 or 25, the output signals of the present example are taken from the collector 27 of the second multivibrator transistor 25. A resistor 39 couples the bases 21, 26 of the first and second multivibrator transistors 20, 25, respectively. With this arrangement, the potential level at which the base 26 of the second multivibrator transistor 25 is maintained may be varied to provide a control or correction of the frequency of operation of the multivibrator. Accordingly, a coupling from external circuitry to be described below may be made to the second multivibrator transistor base 26 at what may be termed a control input or a bias level control.

The free-running multivibrator described as the source of periodic signals 10 operates by saturating the two multivibrator transistors 20, 25 on alternate cycles. When the multivibrator begins operating, normal tolerance variations in the circuit elements result in one of the transistors 20 or 25 saturating while the other is cut off. Assuming that the first multivibrator transistor 20 saturates first, the drop in potential of the collector 22 of that transistor insantaneously charges the capacitor 37 which couples the collector 22 to the base 26 of the second mutlivibrator transistor 25. The negative potential at the base 26 of the second multivibrator transistor 25 biases that transistor to cut off. The capacitor 37 discharges through the resistors 35 and 39 which are coupled to the base of the second multivibrator transistor 25, until the potential level of the base 26 has increased in the positive direction to a sufficient value to cause the second multivibrator transistor 25 to saturate.

Saturation of the second transistor 25 then begins the second half cycle of operation, in which the first multivibrator transistor 20 is cut off and the second multivibrator transistor is saturated, the time interval again being determined by the discharge rate of the cross-connected capacitor 38. The circuit accordingly provides a square wave output signal at approximately the nominal frequency established by the values of the circuit elements.

The resistor 39 which couples the bases of the multivibrator transistors 20, 25 serves a dual function in the operation of the multivibrator. The resistor 39 minimizes the effect of reverse resistance in the base-emitter junction, and thus increases the frequency stability of the multivibrator. Additionally, the presence of the resistor 39 at the control input permits variation of the rate of discharge of the cross-connecting capacitors 37 and 38. Thus, by varying the potential level at the base 26 of the second multivibrator transistor 25, the frequency of the multivibrator may be varied.

Output signals from the source of periodic signals 10 are applied to a resonant circuit 12, a phase shifter 14 and an amplifier circuit 15, which together provide a phase reference signal which is dependent upon the frequency of the source 10. At the amplifier 15 the signals are applied through a blocking capacitor 40 and an isolating resistor 41 to the base 46 of an emitter follower transistor 45 of the N-P-N conductivity type. The resonant circuit 12, which controls the amplifier 15, consists of a parallel resonant circuit which is tuned to the nominal frequency of the source 10. A fixed inductance element 50, a fixed capacitance element 51 and a variable capacitance element 52 are arranged in parallel and coupled between the bse 46 and the collector 47 of the emitter follower transistor 45. Signals passed by the resonant circuit 12 accordingly are coupled directly to the base-collector circuit and provide a variable phase control of the output signals from the amplifier circuit 15.

A fixed phase shift of 90° in the amplifier 15 output is provided by an inductance element 55 coupling the collector 47 of the emitter follower transistor 45 to the source of positive potential 30. The emitter follower transistor 45 is maintained normally conducting through use of a bias resistor 57 coupling the base 46 to the source of positive potential 30. With this arrangement, the emitter follower transistor 45 provides output signals in the form of sine waves following the waveform of the signals passed by the resonant circuit 12. These output signals are maintained at a given level relative to a selected reference level by a resistor 58 coupling the emitter 48 to ground. A blocking capacitor 59 is also employed in the coupling between the amplifier 15 and the phase detector 16.

When a square wave from the source of periodic signals 10 is applied to the amplifier 15 and the resonant circuit 12, therefore, sine wave output signals are derived at the emitter 48 of the emitter follower transistor 45. As discussed above with respect to FIG. 2, the resonant circuit 12 introduces a variable phase shift in the output signals and at the same time a fixed 90° phase shift is introduced by the inductance element 55.

Thus, a variably phase shifted periodic signal in substantial phase quadrature with the output signals from the source of periodic signals 10 is applied to one input circuit of the phase detector 16. Signals are also applied to the other input of the phase detector 16 from the output terminal of the source 10 through a blocking capacitor 61 and a series-coupled limiting resistor 62. The phase detector 16 itself consists of a pair of N-P-N type transistors 63, 68 which have a common connection between their collector electrodes 65, 70 and which have emitters 66, 71 coupled to ground. A load resistor 73 couples the common collector connection of the two transistors 63, 68 to the source of positive potential 30.

The phase detector 16 operates by controlling the first of the phase detector transistors 63 with the phase reference signal from the amplifier circuit 15 in such fashion as to provide a low impedance path to ground during alternate half-cycles of the sine wave from the amplifier circuit 15. During these alternate half-cycles, the phase detector 16 acts as an open switch because the first transistor 63 is heavily saturated and signals on the second phase detector transistor 68 do not appear at the output of the phase detector 16. The amplitude of the signals from the amplifier circuit 15 is sufficiently high to control the phase detector 16 operation during this half-cycle. Further, the sine waves from the amplifier circuit 15 are effectively converted to square waves because the rapid saturation of the first transistor 63 both increases the slope of the leading and trailing edges and introduces a clipping action. During alternate half-cycles in which the first transistor 63 is not saturated, however, the phase detector 16 is the equivalent of a closed switch. During these intervals the signal on the second phase detector transistor 68 controls the phase detector 16 output signal.

If the signal from the source 10 during the closed half-cycle is the more positive portion of a square wave, the second phase detector transistor 68 conducts for the entire half-cycle, providing a negative-going output pulse. If the signals from the source of periodic signals 10 are directly in phase quadrature with the outputs from the amplifier circuit 15, the source 10 is operating directly on the desired frequency. When this situation obtains, the signal applied to the second phase detector transistor 68 during the closed half-cycle of the phase detector 16 causes an output signal which is equally divided between high and low amplitude parts. If the phase of the signal from the source 10 shifts with reference to the phase of the reference signals, the balance between the portions of the high and low amplitude signals from the phase detector shifts correspondingly.

Output signals from the phase detector 16 are maintained in a selected range by a voltage divider pair of resistors 74 and 75 which are coupled in series with the source of negative potential 77. The selection of the values of these elements, and the output from the phase detector 16, causes the potential at the midpoint between the resistors 74 and 75 to vary in a selected range about a desired level.

The signal derived at the midpoint of the voltage divider pair of resistors 74, 75 is of a rectangular waveform, and consists for the closed half-cycle of the phase detector 16 operation, the instantaneous values which represent the instantaneous phase relationship between the reference wave and the wave from the source of periodic signals 10. In order to use this form of error signal, the signal is passed through a low pass filter 18 consisting of a coupled resistor 79 and a grounded capacitor 80 which are connected to the control input of the source of periodic signals 10. Signals from the low pass filter 18 represent the average of the high and low amplitude signals derived during the open half-cycles of the operation of the phase detector 16. Such signals consequently represent varying bias levels, suitable for correcting the bias level at the control input of the source of periodic signals 10 and operating to correct the frequency of the source 10 so as to reestablish the center frequency.

It has been found that multivibrator circuits constructed in accordance with FIG. 3 are stabilized by at least an order of magnitude of accuracy. Thus, an astable multivibrator which is subject to a drift effect of approximately one percent, is, when constructed in accordance with FIG. 3, subject to a drift effect of only 0.1 percent. Note that this accuracy is obtained with the use of circuitry which involves only three additional transistors, as well as passive circuit elements in relationships which are inherently stable. Note also that depending upon the system and frequency involved, the resonant circuit device which is employed may be a series resonant circuit, a parallel resonant circuit, or a mechanically resonant structure which has the desired characteristics of the resonance curve, that is, a variation in phase when the frequency departs from the center frequency.

Arrangements thus constructed are particularly useful where the source of periodic signals which is stabilized is required to be resynchronized. The stabilization of frequency is accomplished without affecting the ability of the circuit to be synchronized by an external control signal. Note that if the control input to the source 10 were coupled to both transistors 20 and 25 of the multivibrator there would be an attendant increase in the range over which frequency could be controlled. Some of the circuit elements would, however, have to be duplicated in parallel in this arrangement.

The manner in which the arrangements of FIGS. 1 and 3 may be utilized to provide self-clocking of a binary data signal may be better understood by reference to the arrangement of FIG. 4. As is therein shown, a source of binary data signals 90 provides digits of data at substantially regularly spaced intervals by establishing a waveform having binary transitions which signify binary values. As previously described, the source 90 may be subject to jitter distortion (phase displacement of the signals due to line delay) and may also transmit messages in which relatively long periods transpire without the occurrence of a binary transition. It is desired that the self-clocking arrangement operate to sample the data at the binary transition points, and stay in synchronism with the binary transition points despite jitter distortion and the occurrence of relatively long periods in which binary transitions are not provided.

To this end, there may be utilized a free-running multivibrator 91, or other source of periodic signals, having a characteristic frequency which matches that of the data rate of the individual digits of information in the data from the source 90. The multivibrator 91 may be controlled at an output terminal by clamping the voltage level thereof at an amplitude which maintains the multivibrator 91 in a selected state until the clamping level is released. In conjunction with this feature, a clamping signal generator 92, which may be a one-shot multivibrator or other form of triggered pulse generator, is employed, coupled to the output terminal of the free-running multivibrator 91. The clamping signal generator 92 responds to the binary transitions in the data to generate a clamping pulse which is one-half the duration of a data interval in the binary data signals. The binary transitions are arranged to fall in the center of data intervals during transmission, so that the clamping signal generator maintains the free-running multivibrator 91 in the selected state only until the interval is complete. After termination of the clamping signal the multivibrator 91 resumes operation by immediately switching to the alternate state. Thus, the multivibrator 91 is resynchronized or self-clocked by the binary transitions in the data.

When the data signals are subjected to jitter distortion, a shift in the time of occurrence of the binary transition from the point at which the transition would be received if no distortion were present merely causes a corresponding shift in the clocking signals from the multivibrator 91. The multivibrator 91 is, however, subject to long term drift effects, so that in the absence of the binary transition the multivibrator may gradually shift the phase of its output signals until no longer in synchronism with the binary data. Although the multivibrator 91 is resynchronized with the arrival of new data through the operation of the clamping signal generator 92, the information in at least one of the binary transitions is lost in the resynchronization. Accordingly, the periodic pulses from the multivibrator 91 are stabilized by the use of the error signal generator circuits 94 which use the phase of a resonant circuit device tuned to the selected frequency to maintain the multivibrator 91 output signals substantially free of drift effects. Such an arrangement does not disturb the characteristic operation of the multivibrator 91, or the coaction therewith of the clamping signal generator 92. Because the jitter distortion has no effect upon the average data rate, the stabilization of the frequency of the periodic signals from the multivibrator 91 need only maintain the average frequency.

This arrangement accordingly makes available a clocking signal, controlled by the data signals, which remains in synchronism with the binary transitions in the data and which accurately clocks to determine the binary state at each binary transition. Both the data and the clock signals may be applied to a sampling circuit 95 to derive the clocked data. The sampling circuit 95 may consist of a number of logical gating elements arranged to utilize the binary transitions during the clocking intervals so as to derive binary output signals in the form desired for use with further information processing circuitry.

While there have been described above and illustrated in the drawings various systems for accurately generating periodic signals, and for self-clocking the data in binary data signals, it will be appreciated that the invention is not limited thereto. Accordingly, the invention should be considered to embody all modifications, variations or equivalent arrangements falling within the scope of the annexed claims.

What is claimed is:

1. A stabilizing circuit for providing error signals to correct for long term drift in the frequency of a free-running multivibrator from a desired center frequency, the circuit comprising in combination an input circuit coupled to receive signals from the multivibrator, a parallel element tuned circuit resonant at the center frequency and coupled to the input circuit, an emitter follower transistor having its collector-base circuit coupled to the tuned circuit, an inductance coupled to the collector of the emitter follower transistor and providing a 90° phase shift in signals therefrom, a common-collector dual transistor phase detector circuit, the base of one of the transistors being coupled to the emitter of the emitter follower transistor and the base of the other of the transistors being coupled to the input circuit, the phase detector thereby providing signals having amplitudes corresponding to the instantaneous phase relationships of the signals provided thereto, and a low pass filter coupled to the common collectors of the dual transistors for averaging the signals therefrom to provide error signals for the control of the free-running multivibrator.

2. A long term stabilizer circuit for providing a self-clocked, adjustable pulse generator circuit and comprising a free-running transistor multivibrator having a nominal center frequency but subject to long term drift effects, the multivibrator including a pair of cross-connected transistors and a resistor coupling the bases of the transistors, the base of one of the transistors serving as a control bias input for control of the frequency of the multivibrator, a parallel element inductance-capacitance tuned circuit which is resonant at the center frequency and which is coupled to receive signals from the multivibrator, an emitter follower amplifier transistor having its collector-base circuit coupled to receive signals from the tuned circuit, an inductance coupled to the collector of the emitter follower transistor and providing a 90° phase shift in signals therefrom, a common-collector dual transistor phase detector circuit, the base of one of the transistors being coupled to the emitter of the emitter follower transistor, the base of the other of the transistors in the phase detector circuit being coupled to the multivibrator, a low pass filter coupled to the common-collectors of the dual transistors for averaging the signals therefrom to provide error signals, and means coupling the low pass filter to the bias control input of the multivibrator.

3. A system for providing self-clocking of binary data signals which are subject to jitter distortion, the system comprising a free-running multivibrator having a control input at which frequency control voltage levels may be applied, a clamping pulse generator responsive to binary transitions in the binary data signals and coupled to the multivibrator to provide clamping pulses thereto having a duration of approximately one-half the duration of the binary signals, frequency sensitive means responsive to signals from the multivibrator for providing like signals having a variable phase relation dependent upon the multivibrator signal frequency, and phase sensitive means responsive to signals from the multivibrator and the frequency sensitive means and coupled to the control input of the multivibrator to provide frequency control voltage levels thereto.

4. A clock pulse generator system which is self-clocked with binary data signals subject to jitter distortion, the system including means operable in response to the data signals for generating clamping pulses, each of which starts in phase with a transition point of the data signals and is of the duration of approximately one-half of a binary digit of the data signals, an astable device having a nominal free-running frequency which corresponds to the binary digit rate of the data signal, the astable device generating a clock signal, means connected to the astable device and responsive to the clamping pulses for rephasing the clock signals at each data transition point in the binary data, passive reference means coupled to the astable device for providing a phase shifted signal dependent upon the frequency of the astable device, the phase shift corresponding to the deviation of the astable device from the nominal frequency, and means connected to the astable device and the passive reference means and responsive to the phase relationship of signal therefrom for correcting the frequency of the astable device.

5. A clock pulse generator system which is self-clocked with binary data signals subject to jitter distortion, the system including means operable in response to the data signals for generating clamping pulses, each of which starts in phase with a transition point of the data signals and is of the duration of approximately one-half of a binary digit of the data signals, an astable device having a nominal free running frequency which corresponds to the binary digit rate of the data signals, the astable device generating a clock signal and having a control input, means connected to the astable device and responsive to the clamping pulses for rephasing the clock signals at each data transition point in the binary data, frequency sensitive means responsive to signals from the astable device for providing like signals having a variable phase relation dependent upon the astable device signal frequency, and phase sensitive means responsive to signals from the astable device and the frequency sensitive means and coupled to the control input of the astable device to provide frequency control voltage levels thereto.

6. A system for providing self-clocking of binary data signals which are subject to jitter distortion, the system comprising a free running mutivibrator having a control input at which frequency control voltage levels may be applied, a clamping pulse generator responsive to binary transitions in the binary data signals and coupled to the multivibrator to provide clamping pulses thereto having a duration of approximately one-half of the binary signals, passive reference means coupled to the multivibrator for providing a phase shifted signal dependent upon the frequency of the multivibrator, the phase shift corresponding to the deviation of the multivibrator from the nominal frequency, and means connected to the multivibrator and the passive reference means and responsive to the phase relationship of signals therefrom for correcting the frequency of the multivibrator by change of the frequency control voltage levels at the control input of the multivibrator.

7. A system for providing self-clocking of binary data signals which are subject to jitter distortion, including a cyclic signal generator having a control input at which frequency control voltage levels may be applied, means responsive to binary transitions in the binary data signals for clamping the signal generator for a selected duration less than the duration of the binary data signals in response to each binary transition in the data signals, passive reference means coupled to the signal generator for providing a phase shifted signal dependent upon the frequency of the signal generator, and means coupled to the signal generator and the passive reference means and responsive to the phase relationship of signals therefrom for providing a control signal to the control input of the signal generator to correct the frequency of the signal generator.

8. A clock pulse generator system which is self-clocked with binary data signals subject to jitter distortion, but substantially free from long term drift, the system including means operable in response to the data signals for generating clamping pulses, each of which starts in phase with the transition point of the data signals and is of approximately one-half the duration of a binary digit of the data signals, an astable multivibrator having a nominal free running frequency which corresponds to the binary digit rate of the data signal, the astable multivibrator generating the self-clocking signals for the binary data signals, means connected to the astable multivibrator and responsive to the clamping pulses for rephasing the clock signals at each data transition point in the binary data, passive circuit means coupled to receive signals from the astable multivibrator for providing a phase shifted signal corresponding to the deviation of the astable multivibrator from the nominal frequency, and means connected to the astable multivibrator and the passive circuit means and responsive to the phase relationship of the signals from the multivibrator and the passive circuit means for providing a control signal to correct the frequency of the astable multivibrator.

9. A system for providing self-clocking of binary data signals which are subject to jitter distortion, the binary states being indicated by pulse and no pulse conditions respectively, the system comprising a free running multivibrator having a control input at which frequency control voltage levels may be applied, the multivibrator providing rectangular waveform clock signals for the clocking of data, a clamping pulse generator responsive to binary transitions in the binary data signals and coupled to the multivibrator to provide clamping pulses thereto having a duration of approximately one-half the duration of the binary signals, a data sampling circuit coupled to pass self-clocked data signals under control of the clock signals as adjusted by the clamping pulse signals, and an error signal generator coupled to receive the clock signals from the multivibrator and to provide error signals in the form of voltage levels to the control input of the multivibrator, the error signal generator including passive frequency sensitive means responsive to signals from the multivibrator for providing like signals having a variable phase relation dependent upon the multivibrator signal frequency, and phase sensitive means responsive to signals from the multivibrator and the passive frequency sensitive means coupled to the control input of the multivibrator.

References Cited in the file of this patent

UNITED STATES PATENTS

| | | |
|---|---|---|
| 2,065,565 | Crosby | Dec. 29, 1936 |
| 2,256,083 | George | Sept. 16, 1941 |
| 2,537,769 | Law | Jan. 9, 1951 |
| 2,752,512 | Sarratt | June 26, 1956 |
| 2,848,610 | Freienmuth | Aug. 19, 1958 |

OTHER REFERENCES

"An Analog-to-Digital Converter With an Improved Linear-Sweep Generator," by Slaughter in IRE part 7 Convention Record of March 23–26, 1953, pages 7–12.